United States Patent [19]
Munter et al.

[11] Patent Number: 5,126,999
[45] Date of Patent: Jun. 30, 1992

[54] METHOD AND APPARATUS FOR INPUT-BUFFERED ASYNCHRONOUS TRANSFER MODE SWITCHING

[75] Inventors: Ernst A. Munter, Kanata; Ian Perryman, Ottawa, both of Canada

[73] Assignee: Northern Telecom Limited, Canada

[21] Appl. No.: 399,925

[22] Filed: Aug. 29, 1989

[30] Foreign Application Priority Data

Apr. 20, 1989 [CA] Canada ............................ 597325

[51] Int. Cl.⁵ .............................................. H04J 3/26
[52] U.S. Cl. ........................................ 370/60; 370/85.6
[58] Field of Search ............... 370/60, 61, 94.1, 85.6

[56] References Cited

U.S. PATENT DOCUMENTS

| | | | |
|---|---|---|---|
| 4,730,305 | 3/1988 | Acampora et al. | 370/60 |
| 4,868,813 | 9/1989 | Suzuki | 370/60 |
| 4,899,335 | 2/1990 | Johnson, Jr. et al. | 370/60 |
| 4,947,388 | 8/1990 | Kuwahara et al. | 370/60 |

Primary Examiner—Douglas W. Olms
Assistant Examiner—Melvin Marcelo
Attorney, Agent, or Firm—Lerner, David, Littenberg, Krumholz & Mentlik

[57] ABSTRACT

An ATM packet switching system has output segregated input buffers, which are operated on a realtime by crosspoint selection circuits implementing a combined buffer fill/age algorithm to come up with a new selection every packet cycle.

3 Claims, 12 Drawing Sheets

FIG. 7

METHOD AND APPARATUS FOR INPUT-BUFFERED ASYNCHRONOUS TRANSFER MODE SWITCHING

BACKGROUND OF THE INVENTION

1. Field of the Invention

The present invention relates to high speed packet switching in general, and to space-division switching of fixed length data packets in particular. More particularly still, it relates to asynchronous transfer mode (ATM) packet switching by means of input-buffered N×N switching or cross-point matrices.

2. Prior Art of the Invention

A useful introduction briefly summarizing the state of the art is given by J. Y. Hui in a paper published Mar. 1989 in IEEE Network titled "Network, Transport, and Switching Integration for Broadband Communications" under the subheading "Packet Switching for ATM Networks" at page 49. This part of the paper is quoted in full below:

"We now consider switching mechanisms for interconnection of ATM links. In particular, we shall focus on the predominant mode of ATM, namely, the format using fixed length packets or cells.

The TMS, used for switching STM links, can also be reconfigured per packet time for connecting ATM links. The same problem of output contention for the TMS arises. As we mentioned before, circuit switching connecting STM links utilizes TSI at both the inputs and outputs to solve this output contention and mismatch problem. However, this is impossible for ATM networks for two reasons.

First, ATM is inherently an FCFS network without a frame reference. Hence, a packet on an input ATM link would have to wait until the output is available. Consequently, an FCFS waiting room via buffering, instead of buffering for TSI, is necessary at the inputs. Second and more important, the destination addresses of packets on an ATM link may not have the periodic structure inherent in an STM network, for which each slot in a frame is dedicated to the communication between two terminals. The periodic structure for STM implies that the cross-point setting of the TMS reconfigures periodically per frame. Therefore, the cross-point settings per frame can be precomputed and stored for controlling the TMS. This computation can become quite complicated when the TMS itself is a multi-stage network. So far, efforts for producing a fast parallel control algorithm for the TST network have failed to give a satisfactory control method for packet switching, for which the TMS cross-point setting has to be recomputed once per packet time since the input-output connection pattern changes every slot.

Two major switching methodologies are currently known for interconnecting large numbers of ATM links. The first approach alleviates output contention, or contention anywhere in a multi-stage connection network, by extensively using FCFS buffering at the internal links of the switching network. The interconnection network used is often a variation of the banyan network [14]. Therefore, contention is localized to switch nodes with buffering to hold contending packets.

The second approach avoids the use of internal buffering but employs sorting as a switching mechanism for computing cross-point setting and resolving output contention. The interconnection network used is a Batcher sorting network placed before a banyan-type network. This Batcher-banyan approach [15] [16] is more suitable for optical implementation than the buffered banyan approach because less buffering is necessary."

In an earlier paper by Mark J. Karol et al published in the IEEE Transactions On Communications, Vol. COM-35, No. 12, Dec. 1987, p. 1347, entitled "Input Versus Output Queueing on a Space-Division Packet Switch", the authors conclude as follows:

"Using Markov chain models, queueing theory, and simulation, we have presented a thorough comparison of input versus output queueing on an N×N nonblocking space-division packet switch. What the present exercise has done, for a particular solvable example, is to quantify the intuition that better performance results with output queueing than with input queueing."

The closest prior art known is disclosed in a paper by H. Inoue et al, titled "InP Based 4×4 Optical Switch Module and Its Application to ATM Switching", published in the Proceedings of the OSA Topical Meeting of Photonic Switching 1989 at pages 115-117 (paper FA4). Even though the paper is not directly concerned with the subject matter of the present invention. FIG. 8 therein, showing a "Switching stage", has a 4×4 space-division switching module (OSM) having input buffer memory (Input BFM).

The associated description, under the subheading "(2) Switching stage", is as follows:

"Cell switching is realized by transmitting cells through the OSM after setting the OSM connections according to the destination port number obtained from the VCI in the cell header. Cells in the input buffers are processed on a first-in first-out basis. Destination port numbers of the cells are analyzed by the cell output controller (OUT CONT) and transferred to the cell switch controller (SW CONT). The cell switch controller analyzes cell transfer requirements and determines cells to be transferred. When plural cells are destined to the same output port, only one cell is selected. Arbitration results are sent back to the cell output controllers and, OSM connections are arranged simultaneously. The cell output controllers which obtain permission for cell transfer, send cells to the OSM and the cells are then transferred to the destined output ports."

In the switching stage of Inoue et al, only one input buffer per input port of the switching matrix is used. For a switch with only four input ports, the use of a single FIFO (first-in-first-out) buffer would not result in unacceptable blocking, given favourable traffic statistics.

Other prior art includes the well-known Batcher-Banyan architecture, wherein input buffers precede a Batcher sorting network which is followed by contention detectors and a Banyan routing network. In such a network only packet or cell headers are launched from the input buffers into the sorting network at the output of which packets destined for the same output appear on adjacent ports. The contention detectors are a vertical slice of N−1 comparators. They detect identical destinations and report backwards through the still open two-way paths of the Batcher sorter to the input buffers. The contention detectors select one packet from each set having identical destination for a subsequent launch through the Banyan routing network. The basic unit of a Batcher-Banyan network is a 2-by-2 sorting and routing unit.

The two-phase (two launches) operation is necessary because it is not sufficient to present the routing network with just an ordered set of headers, wherein duplicates are identified by a "NOGO". Rather, the "GO" headers must also appear on contiguous ports with all the "NOGO" headers arranged to one side. By relaunching the packets in the second phase with all "NOGO" packets given a numerical header value of either 0 to N+1 (in an N×N matrix), the sorting network will cause all "NOGO" packets to aggregate at one end of the cross section of ports. The same objective could be achieved in a single phase by adding a second sorting network between contention detectors and routing network. However, it is likely that the disadvantage of delay and logic overhead of double launching is less than that of adding a third network. And in any event, notification of "NOGO" packets still have to be fedback to the input buffers to allow retries on subsequent switching cycles.

SUMMARY OF THE INVENTION

The present invention is based on the premise that the best switching traffic occupancy, on average, will be achieved by making use of all available information in resolving contention for output ports of the switching matrix.

In its broadest apsect, therefore, the method of the present invention comprises the steps of: storing all incoming data packets in order of arrival in a plurality of input packet buffers; polling all incoming data packets for their switch output port destinations; determining on a realtime basis a first plurality of data packets among data packets stored in said plurality of input packets buffers to be applied to input ports of said switch during a packet transmission cycle, following determination of said first plurality of input packets, for transmission through said switch to its output ports; and applying said first plurality of data packets to said input ports.

In a narrower aspect of this method, the first plurality of data packets is determined by: prioritizing data packets stored in said plurality of input packet buffers; and including only those data packets, in order of priority, in said first plurality of data packets whose output port destination differs from port destinations of data packets having a higher order of priority.

In a preferred example of this method, the order of priority of incoming data packets is established by: measuring the fill of each of said plurality of input packet buffers; and measuring the number of transmission cycles during which no data packets have left each of said plurality of input packet buffers.

In a broad aspect of the present invention, a packet switching system for cyclically interconnecting a first plurality of input-ports to a second plurality of output-ports, wherein input data packets arriving at said plurality in input ports bear information identifying their output port destinations, comprising: a third plurality of input-port packet storage buffers, each having a fourth plurality of independent first-in-first-out (FIFO) packet storage buffers; and said second and fourth pluralities are equal in number and bear a fixed assignment relationship on a one-to-one basis to each other irrespective of cyclical interconnections between said first and second pluralities.

A switching apparatus according to the present inventionc comprises: a switch having a plurality of independent input ports and a plurality of independent output ports, said switch cyclically reconfigurable in response to switch control means; a plurality of independent input packet storage buffers, one each for cyclically applying a data packet to each one of said plurality of independent input ports; a cyclically updated memory map for storing predetermined status indicia of said plurality of independent input packet storage buffers; and means for cyclically applying said status indicia to said switch control means to reconfigure it.

In a narrower aspect, each input packet storage buffer being a first-in-first-out (FIFO) buffer.

In a yet narrower aspect, the number of input ports equals the number of output ports.

A useful paper by the present inventor, "Input-Buffered ATM Switch Traffic Performance," presented at the 1989 Multimedia Conference in Ottawa, Canada, Apr. 20-24, 1989, explains simulation results according to a narrow aspect of the method of the present invention. In this aspect buffer fill is used as a primary criterion for prioritizing input data packets, but when a FIFO's age exceeds a predetermined threshold, a large number is added to the buffer fill value to increase the apparent priority of long-waiting buffers.

BRIEF DESCRIPTION OF THE DRAWINGS

The preferred embodiment of the present invention will now be described in detail in conjunction with the annexed drawings, in which:

FIG. 7 is an illustration of the results of selection through one packet switching cycle;

DETAILED DESCRIPTION OF THE PREFERRED EMBODIMENT

Figure 1:
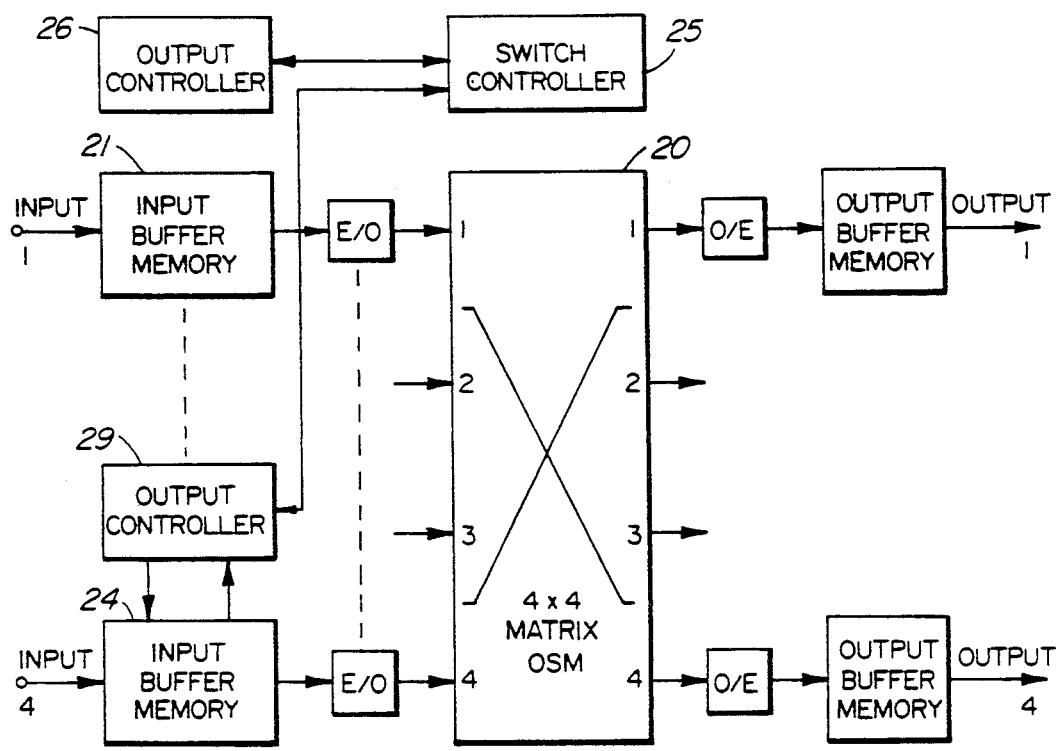
FIG. 1 is a block schematic showing an input-buffered prior art system.

FIG. 1 of the drawings is a block schematic of the prior art "Switching stage" according to the paper by inoue et al. There is a 4×4 switching module 20 (actually an optical switching module OSM). There are, of course, four inputs 1 to 4 to the switching stage, each feeding an input buffer memory 21 to 24, which are connected to the input ports of the switching module 20 via electro-optical converters E/O. The input buffer memories 21 to 24 are first-in first-out (FIFO) buffers as explained in the quote hereinabove from the paper. A cell switch controller 25 analyses cell (i.e. packet) transfer requirements and determines cells to be transferred. When plural cells are destined to the same output port, only one cell is selected. The arbitration results are sent back to cell output controllers 26 to 29 to cause only those having permission to send cells to do so. At the same time, the switch controller 25 sets up the connections in the OSM 20.

Figure 2:
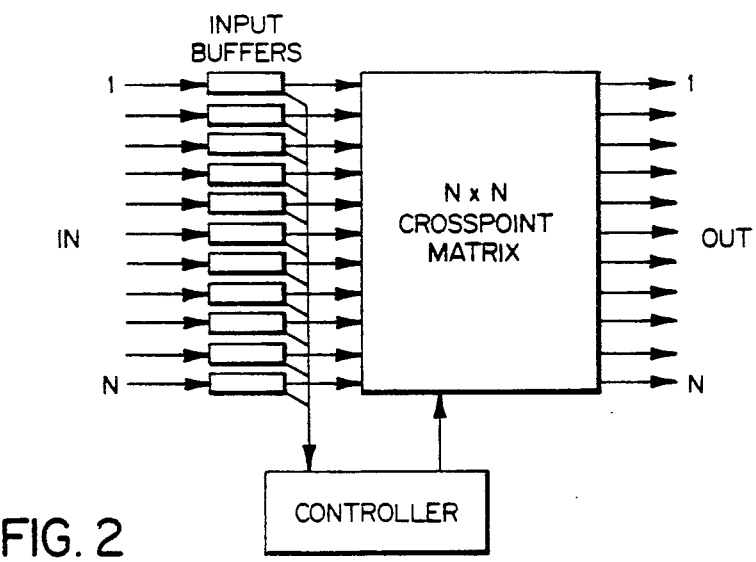
FIG. 2 is a high level block schematic common to both prior art and the present system.

At a high level the switching stage architecture of the present invention is identical to that shown in FIG. 1, both having the common feature that they are input-buffered switching crosspoint matrices controlled by an arbitrating controller. This high level architecture is illustrated in FIG. 2 of the drawings, showing a general N×N crosspoint switching matrix, buffered by N input buffers, one at each of its N input ports.

Figure 3:
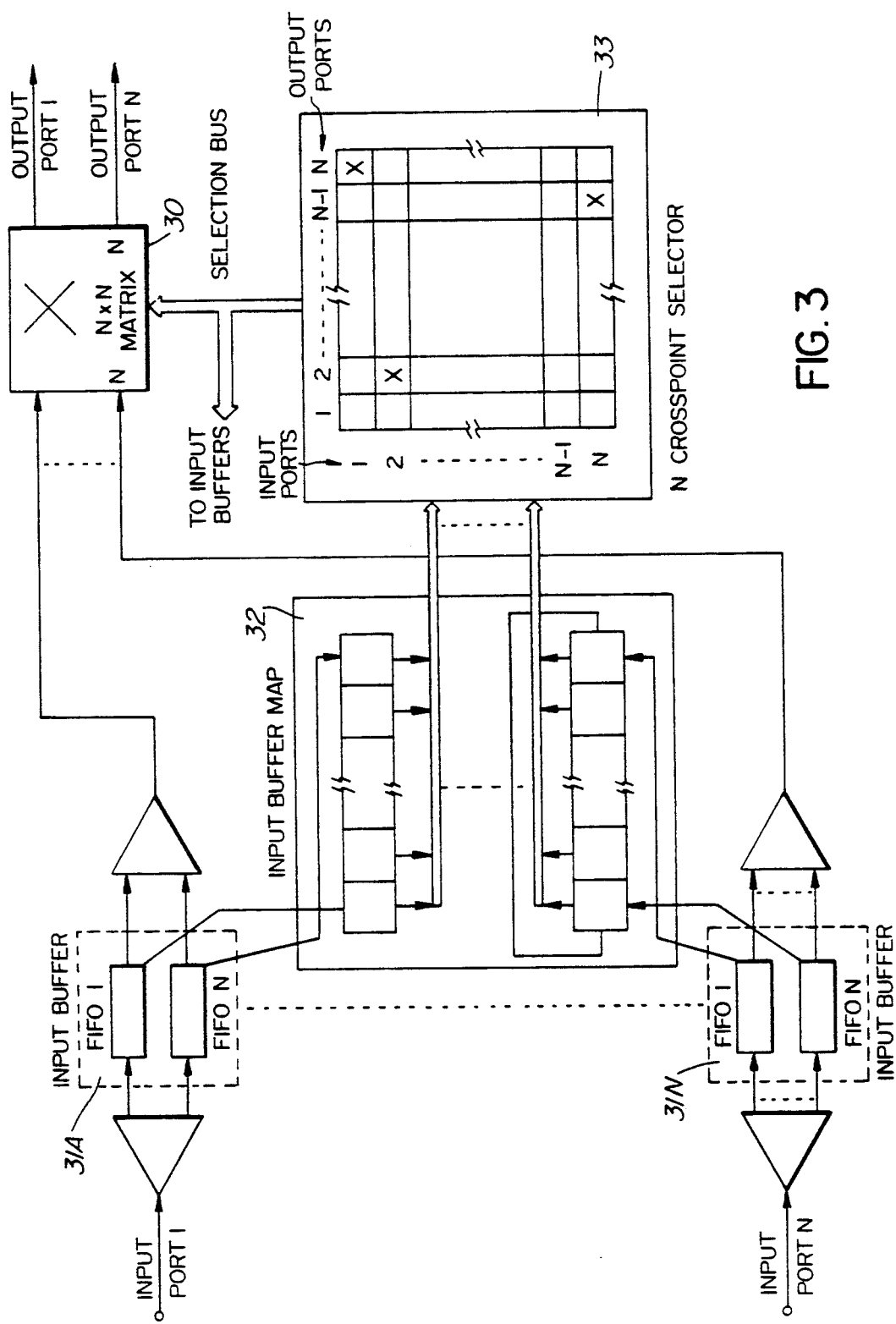
FIG. 3 block schematic showing a packet switching system according to the present invention.

With reference to FIG. 3 of the drawings, two differences of the present invention from the prior art will be explained. First, the switching matrix 30 input ports are each buffered by input buffers 31A to 31N, each of which is not simply a FIFO but is an output segregated input buffer. That is, an input buffer 31J itself comprises N independent FIFO buffers, each of which stores on a first-in first-out basis incoming data packets having the same output port destination of the switch 30. Secondly, an input buffer map (IBM) 32, which dynamically reflects the status of input packets and buffers, is operated on by means of an N crosspoint selector 33 to yield a new selection of N crosspoints in the switch 30 for connection every packet cycle, that is on a realtime basis. There is, of course, a two cycle delay to account for the time it takes for packet departure and arrival in an input buffer.

In the preferred embodiment N=16, and the selection of 16 crosspoints from 256 is not trivial. This problem is generally known as the assignment problem, requiring a worst-case number of operations of $N^3$ for the optimal solution. This would simply be unacceptable for realtime operation of a pocket switch, whether the solution were to be implemented by software of hard-wired algorithms. However, a preferred heuristic shortens the worst-case number of operations to $N^2$. As will be seen later on, these $N^2$ operations are partially implemented in parallel, thus reading the worst-case number of steps to the order of N steps.

Figure 4:
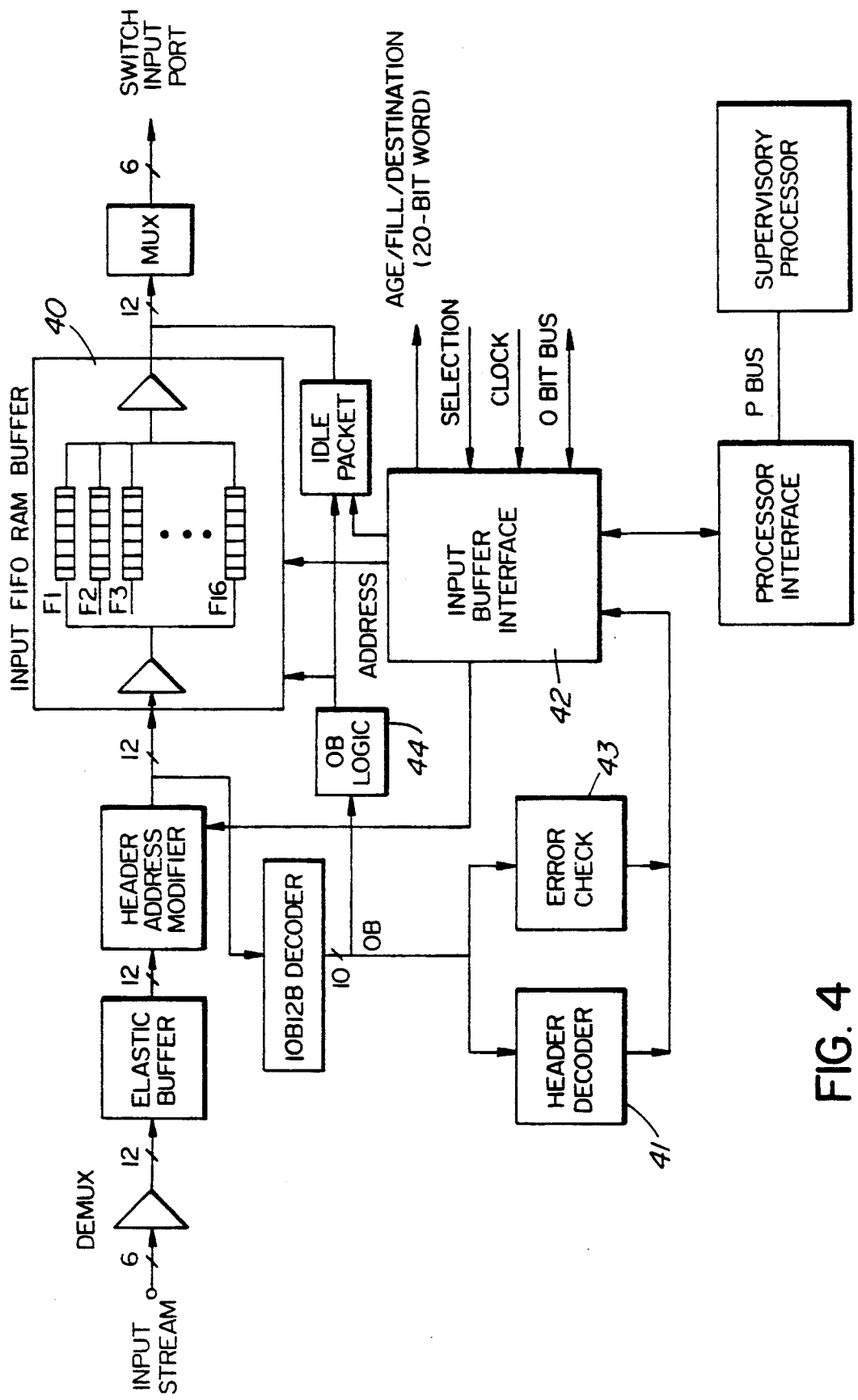
FIG. 4 is a block schematic showing the input buffer circuit in FIG. 3 in more detail.

We now turn to FIG. 4 of the drawings, which is a block schematic showing an input buffer 40, being a random-access-memory (RAM) organized into 16 independent FIFOs each of which is 128 packets long; each packet is 80 Bytes in length. The high speed input data stream is demultiplexed from 6 to 12 bit code and, after elastic buffering, enters a header address modifier prior to entering the buffer 40, where the packets are stored in FIFOs F1 to F16 depending on each packets's switch output port destination. This is accomplished by decoding each packet header in header decoder 41, the output of which steers the packets into the appropriate FIFO F1 to F16 via input buffer interface 42. The data are stored in the FIFOs in 12 bit 10B12B code words. As a data packet is being written into a FIFO, an error detector 43 is calculating its own check byte for the entire packet. As the packet ends, the locally calculated check byte is compared to the one received from the header and the faulty packet is discarded upon non-coincidence and the FIFO's write pointer is reset to the last byte of the previous packet address. If there is coincidence and the pockets is not faulty, the number of packets in that FIFO is incremented accordingly and the buffer fill information is output on the FILL bus. (Similarly, the fill number is decremented upon a FIFO being selected to output a packet). As anyone of the FIFOs F1 to F16 approaches a predetermined fraction of its full capacity, say 50% or 64 packets, an overload bit OB is set in the header by means of the OB logic 44 and broadcast on the OB bus, which is accessed by all input ports. An idle packet is broadcast for one packet cycle to the input data sources to inform them to stop transmitting data to that particular port.

Figure 5:
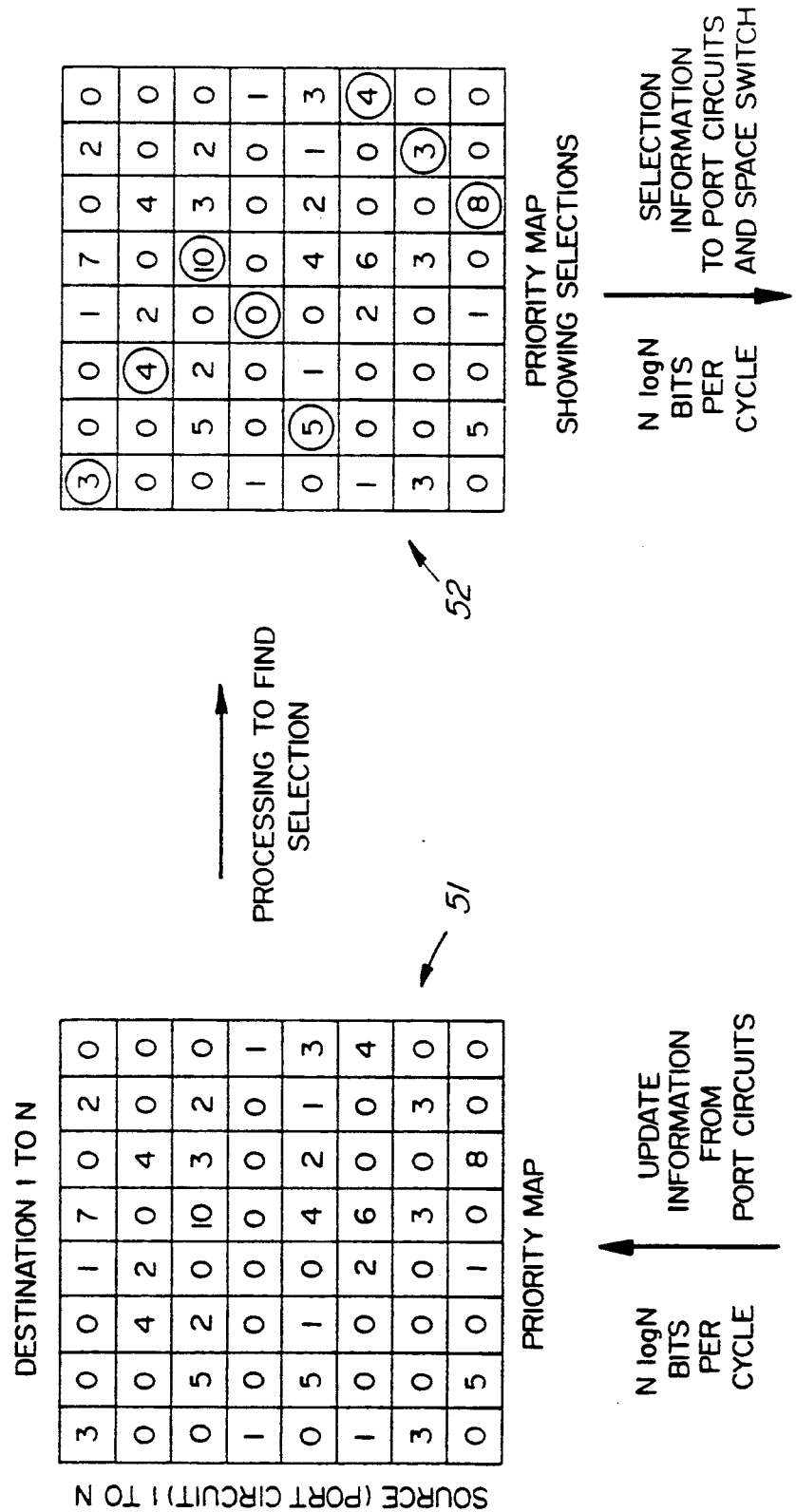
FIG. 5 is an illustration of the principle of the operation of the N crosspoint selector showing in FIG. 3.

Proceeding now to FIG. 5 of the drawings, which illustrates the principle of operation of the N-packets selector 33, we shall use an example switching matrix of only 8×8 rather than 16×16, for reasons of ease of illustration. In an 8×8 crosspoint switching matrix there are 64 cross-points and 8!=40,320 possible connections in total, but only 8 legal connections with one input or source port connected to one input or destination port in any packet cycle. Each input port has 8 input FIFOs, one for each output port. The FIFOs correspond on a one-to-one basis to the 64 crosspoints of the switch. In a priority map 51 of 8 rows and 8 columns, therefore, a square corresponds to an input FIFO, with the numerical value in a square representing a queuing priority of the represented FIFO. In a simple example, the priority valve would be the number of packets resident in the FIFO at the end of the previous packet cycle. Thus a FIFO with a large number of packets stored therein would have a high priority (and associated probability) to be served, i.e. read, in the next cycle. The question is how to identify and select those 8 FIFOs to be served in the next cycle based on the priority map reflecting FIFO status (in this example "fill status") in the previous cycle. The result of the selection is indicated by the circles in priority map 52. As may be seen in the selection map 52, the FIFO with the highest priority value, namely "10", is selected. However, in the fourth row a FIFO has been also selected which has a "0", i.e. is empty, in spite of the fact that two other FIFOs in that row have a value of "1". The exact outcome of the selection process will depend on the criteria used to define an optimum; for example, that the sum of all selections is maximized, or that "0" FIFOs are avoided. And while there is a preferred algorithm disclosed herein, the invention transcends any particular algorithm.

Figure 6:
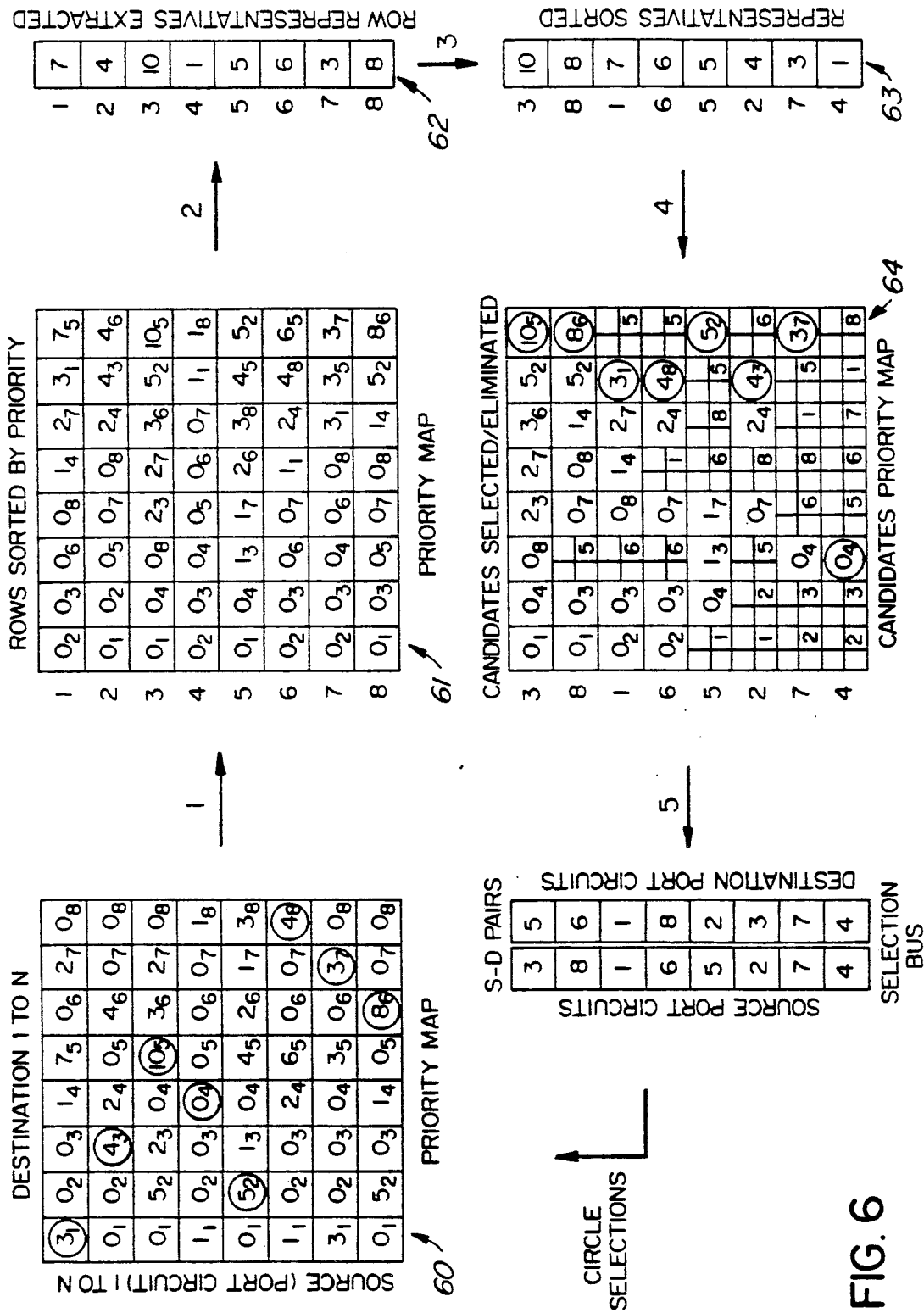
FIG. 6 is a more detailed illustration of the operation of the N crosspoint selector.

The preferred method of the present invention will now be described with reference to FIG. 6 of the drawings. Again, while the preferred implementation is for a 16×16 crosspoint switch, the example shown in FIG. 6 is or N=8. The starting point is priority map 60, ignoring the circles in the squares for the time being. This map 60 is, of course, the representation of numerical values in a homologously organized RAM. The operational steps are as follows:

Step 1: Sort each row of the priority map 60 in ascending order of priority to produce sorted priority map 61.

Comments:

a) The subscripts are there to permit identification of the original column, i.e. the destination output port, after the sorting operation.
b) The sorting of the rows is performed in parallel, thus requiring only N steps instead of $N^2$.

Step 2: Create a representative index for each row.
Comments:
a) A representative 62 created in step 2 is simply the largest values in the sorted map 61.
b) Other possibilities would be to use the row sum, which would favour the input port with the highest aggregate priority, rather than the FIFO with the highest priority. Differently derived numbers may also be used.

Step 3: Sort the representative indices by value (63), thereby effectively ranking the rows according to their representative indices.
Comment:
This operation takes N steps.

Step 4: Starting with the highest ranked row, select the highest priority field (i.e. FIFO), unless it has the same subscript (destination) as any already selected, in which case select the field lower in priority that does not conflict. In the lower ranked rows the fields having selected destinations are eliminated from the list of candidates.
Comments:
a) The result is candidates priority map 64, wherein candidates are circled and eliminations are crossed out. As may be seen the top row (row 3) has one selection like all rows, but no eliminations. While the bottom row (row) 4has all non-selected fields eliminated.
b) This operation takes N steps.

Step 5: Output the selection results of N matched input-/output or source/destination ports to control the crosspoint switch and the input buffers.

Figure 7:
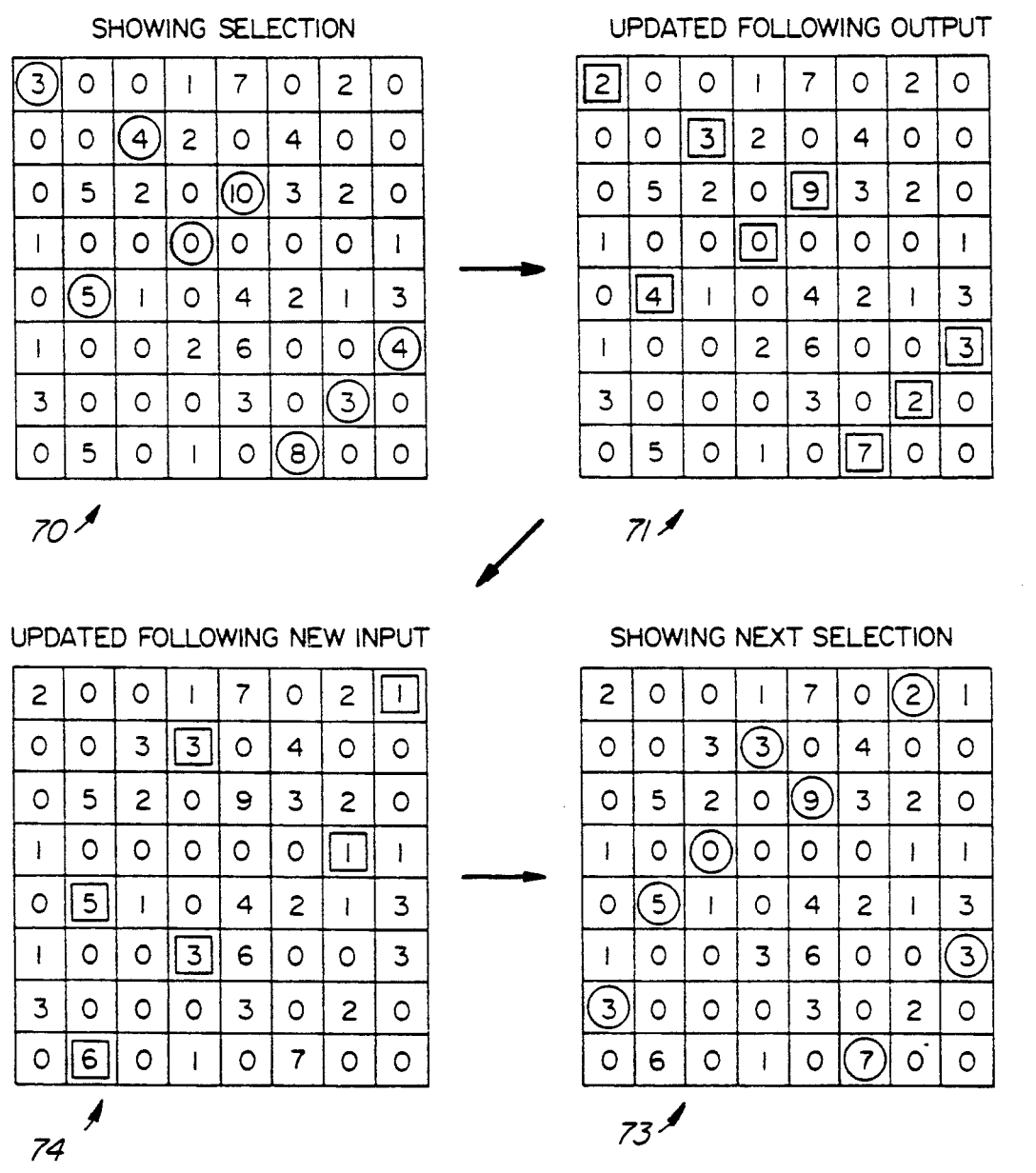

The next drawing FIG. 7 summarizes the results through a packet cycle. Beginning with map 70 after a computation cycle and showing the circled selections, the map 70 is updated to show the departed packets (squares) in map 71, where the identified fields have "1" subtracted from their previous value. The map 71 is then updated in map 72 to reflect the new packet arrivals (squares). Finally, map 73 shows the new selections.

As we have seen, in carrying out the method of the present invention, operations are performed on the input buffer map, which reflects predetermined status indicia of the individual FIFOs dedicated to one input-/output pair of the switching matrix. The nature of the chosen indicia, as well as the exact algorithmic operations, are likely to vary depending on parameters of such as the statistics of switched traffic, and the length of the packets.

Figure 8:
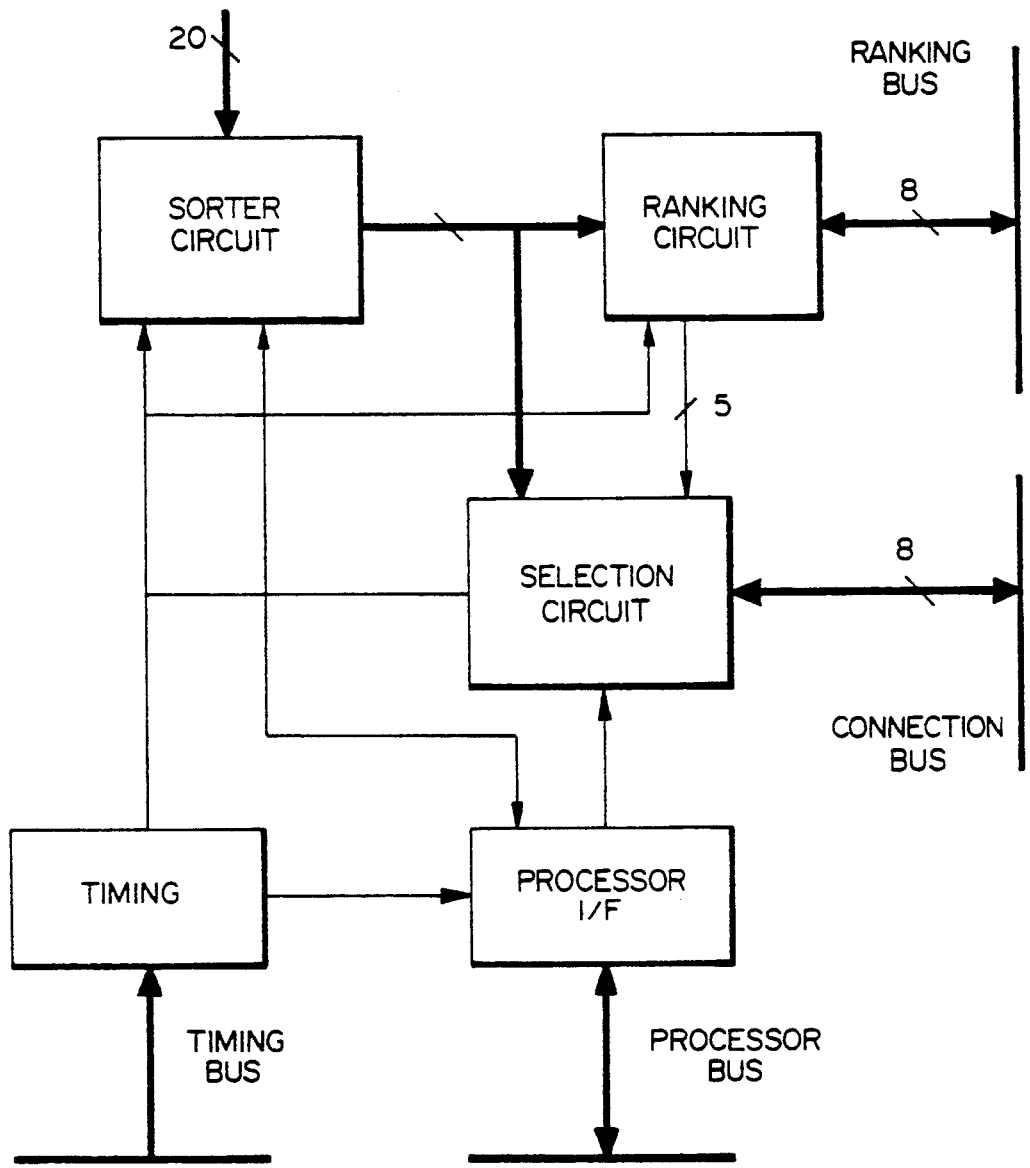
FIG. 8 is a high level block schematic of the N crosspoint selector shown in FIG. 3.

FIG. 8 of the drawings shows the general outline of the part of the apparatus of the present invention which performs the sorting, ranking and selection of FIFOs and crosspoints. There are N such circuits, one for each input buffer, wich operate in parallel on each row of the FIFOs map. Common to all N circuits are the Ranking, Connection, Processor and Timing buses. This circuit outline is self-explanatory and its operation will be better understood in connection with the following FIGS. 9-13.

Figure 9:
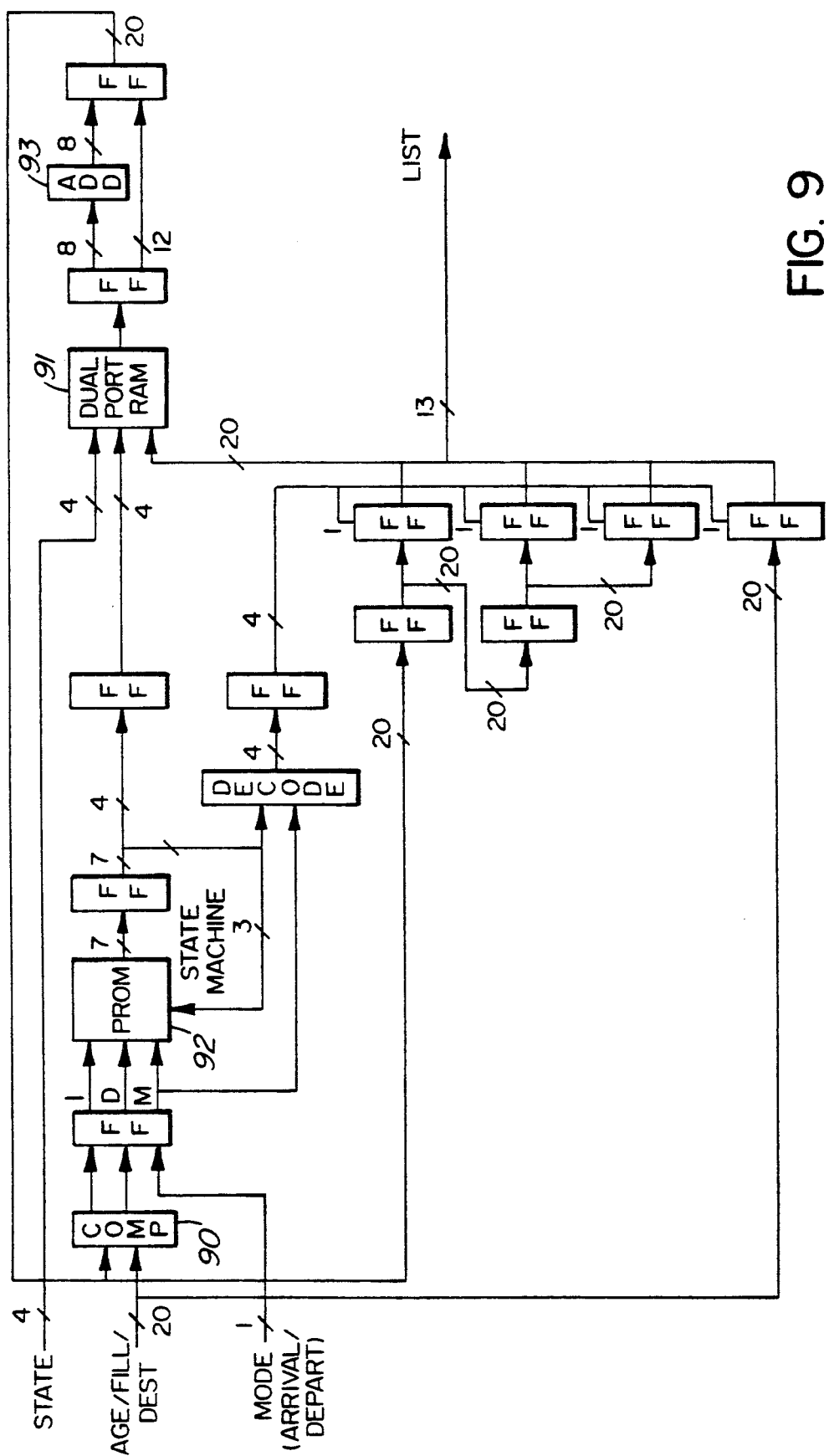
FIG. 9 is a block schematic of the sorter circuit in FIG. 8.
Figure 10:
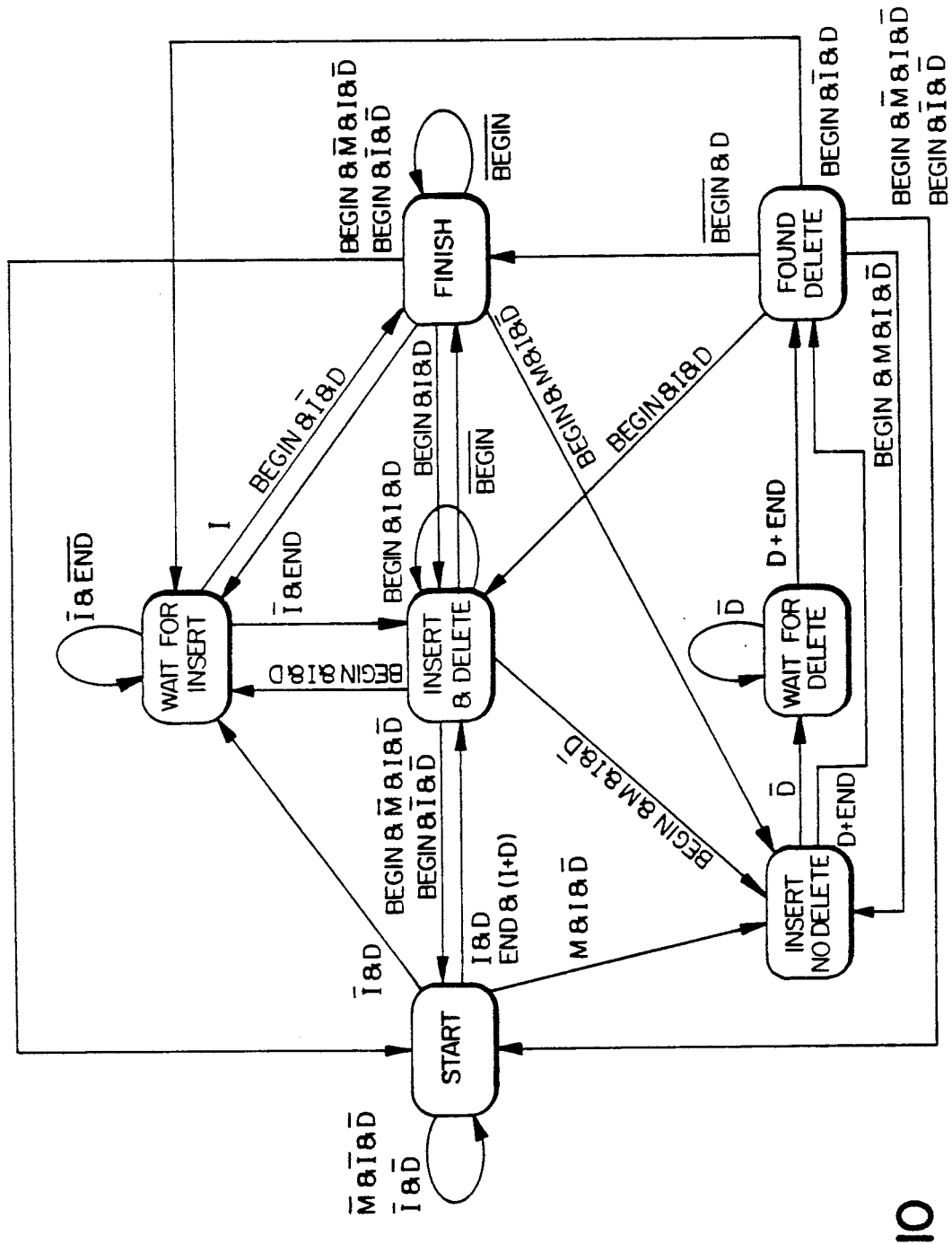
FIG. 10 is state diagram of the state machine shown in FIG. 9.

FIG. 9 shows a block schematic of the sorter circuit, which operates on the map of a FIFO (i.e. on a row in the $N \times N$ priority map) and sorts the fields of the row in order of ascending priority. As explained in the appendix, a combination of age and fill of each FIFO is used to assign a priority number to it. Age here being the number of packet cylces elapsed since the FIFO was last served. Fill is simply the number of packets stored in the FIFO as of the just completed packet cycle. The circuit of FIG. 9 inlcudes a state machine, the associated state diagram is shown in FIG. 10, in which "I" means insert, "D" means delete, and "M" means mode, while $\overline{I}$, $\overline{D}$ and $\overline{M}$ means the negations. Insertion and deletion mean the insertion and deletion of the priority number of a FIFO into or from a particular position in the row of the associated input buffer map. The mode indicates whether the map is being updated to reflect arrived or departed packets, in that order, twice every cycle.

The sorter circuit in FIG. 9 receives at one input of comparator 90 a 20-bit word (priority word) from the input buffer interface 42 (in FIG. 4) which comprises an 8-bit fill value, and 8-bit FIFO age value, and a 4-bit destination address (one out of sixteen possible output ports). The comparator 90 compares 8-bit fill value in the newly arrived 20-bit word sequentially to the N words stored in dual port RAM 91 beginning with the lowest order word (field) in the row. If the new fill value is greater in priority than the previously compared values but lower than the currently compared one, then the new word is inserted into the RAM 91 at that position. Deletions ocur upon a match of fields of identity. Thus the map stored in the RAM 91 is updated twice every cycle, rather than being reconstructed anew. The state diagram of FIG. 10 explains the function of PROM 92 in FIG. 9. The updated priority list is output to the ranking circuit shown in FIG. 11. The list is a 13-bit word consisting of 8 bits for fill and age of a FIFO. The age bit is the most significant bit (MSB) in the fill/age word, which bit is normally "0" (7 bits are sufficient to indicate a full buffer with 128 packets in it). The MSB age-bit is set to "1" only when a FIFO has not been served for a predetermined number of cycles. Adder 93 increments the 8- bit age word by one every cycle, which 8-bit age word is being compared to the predetermined threshold once every cycle. The remaining 5 bits in the list are the age bit and 4 destination bits indicating one out of sixteen output ports.

Figure 11:
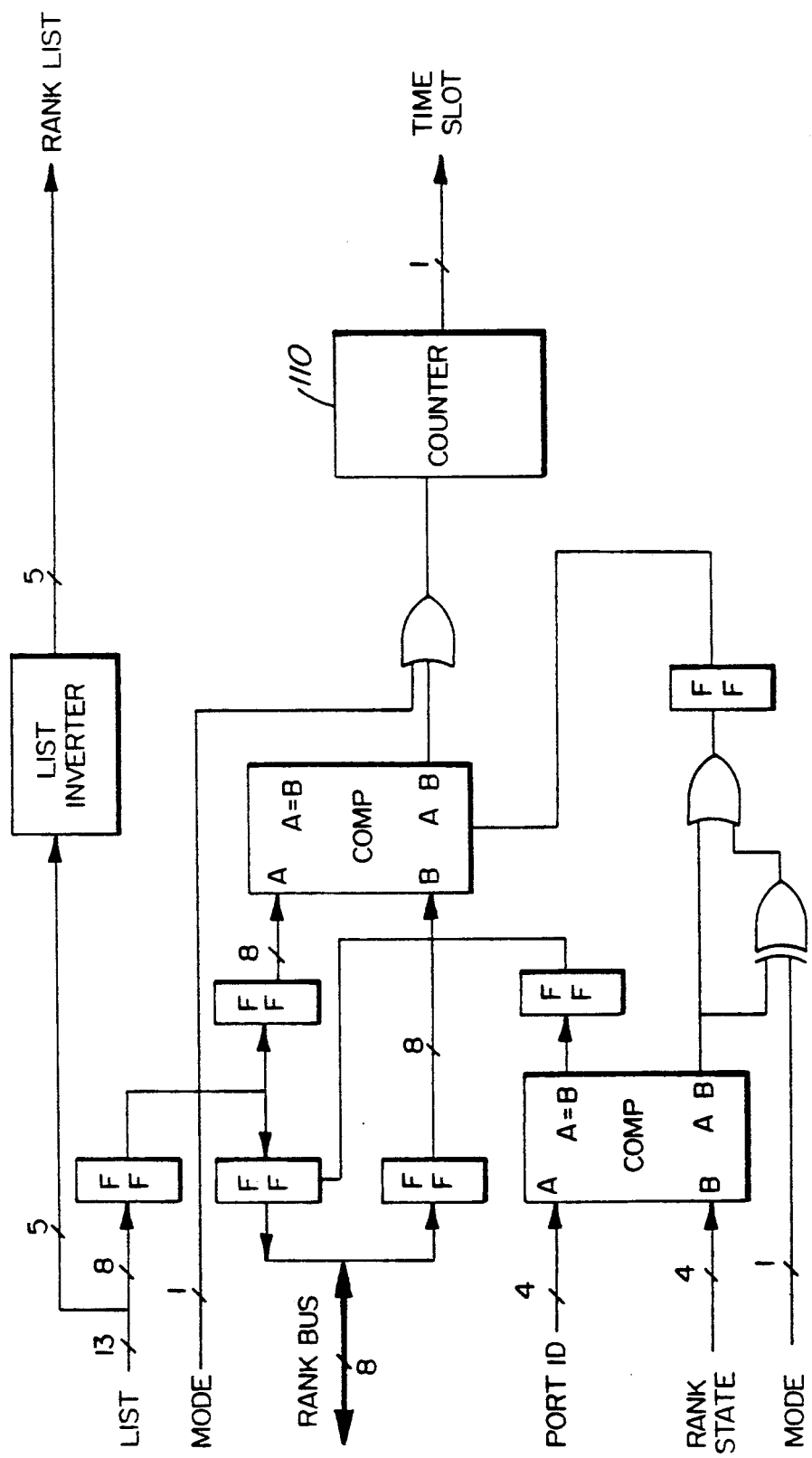
FIG. 11 is a block shematiic of the ranking circuit shown in FIG. 8.
Figure 12:
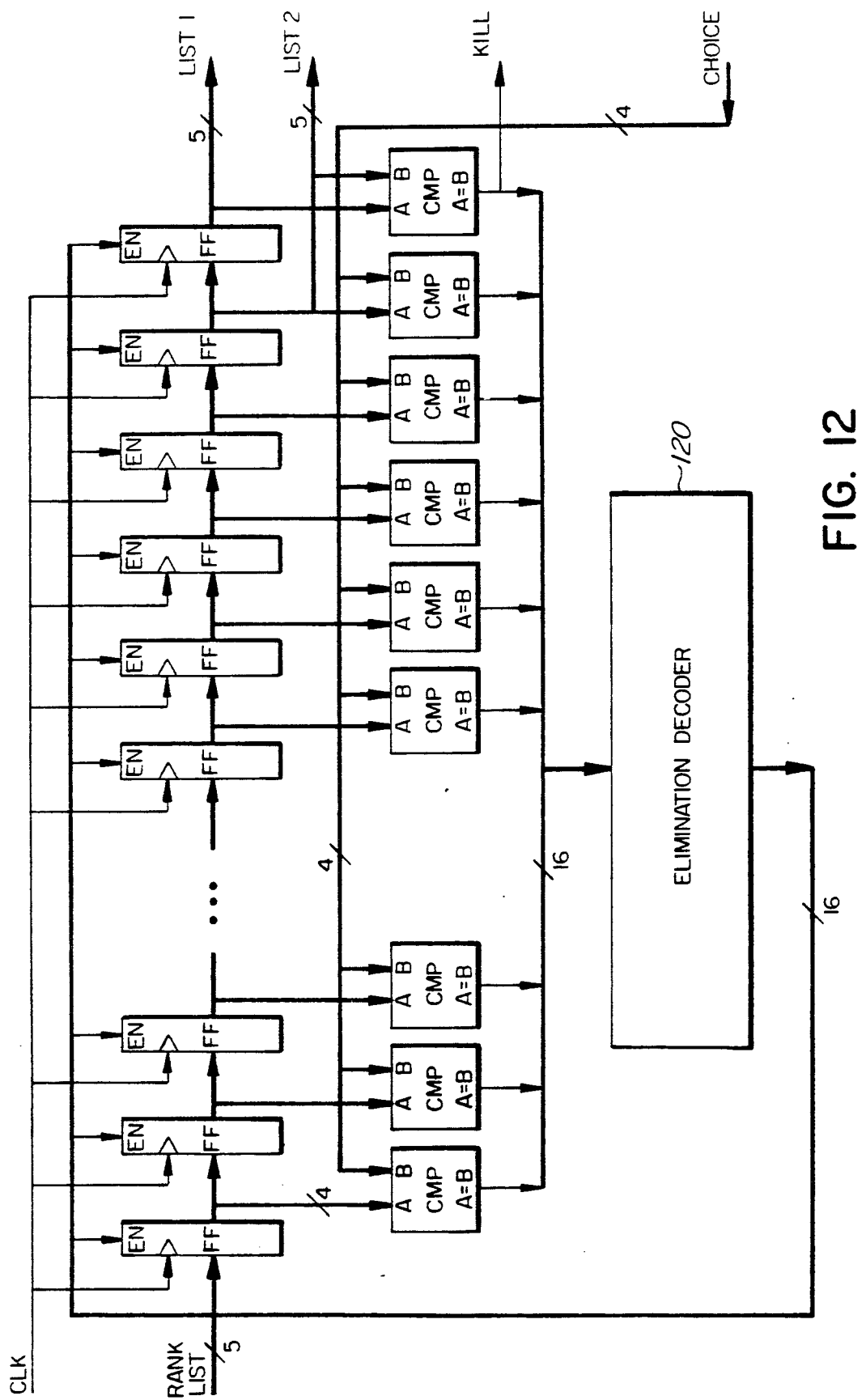
FIG. 12 is a first part of the selection circuit shown in FIG. 8.

The ranking ciruict shown in FIG. 11 accepts the list (which is supplied in inverted priority of destination addresses) and provides the selection circuit in FIG. 12 with a rand list. Since each row representative index (i.e. highest priority vlaue) is at the top (or bottom) of its row list, it is broadcast on the ranking bus by each ranking circuit in sequence according to the input port number. A counter 110 increments only if the broadacast value is greater than its own. Thus at the end of a cycle each counter in the ranking circuits will contain a number equal to the rank of the associated row, the highest ranked being 1, since its counter never incremented, and the lowest equal to N. The counter 110 output is applied to control selection bus drivers 130 and 131 in the second part of the selection circuit in FIG. 13.

In the part of the selection circuit shown in FIG. 12, the rank list advances through the FF-bank from left to right and every distination is compared to the one just selected on the select bus (FIG. 13) in a bank of comparators. In order to eliminate a forthcoming field having the same destination already selected, elimination decoder 120 disables all list 1 flip-flops to the right of the one where its comparator indicates coincidence, and enables all those flip-flops to the left. Thereby causing the destination address in that particular flip-flop to be lost as it is not being clocked into the flip-flop immediately to its right.

Figure 13:
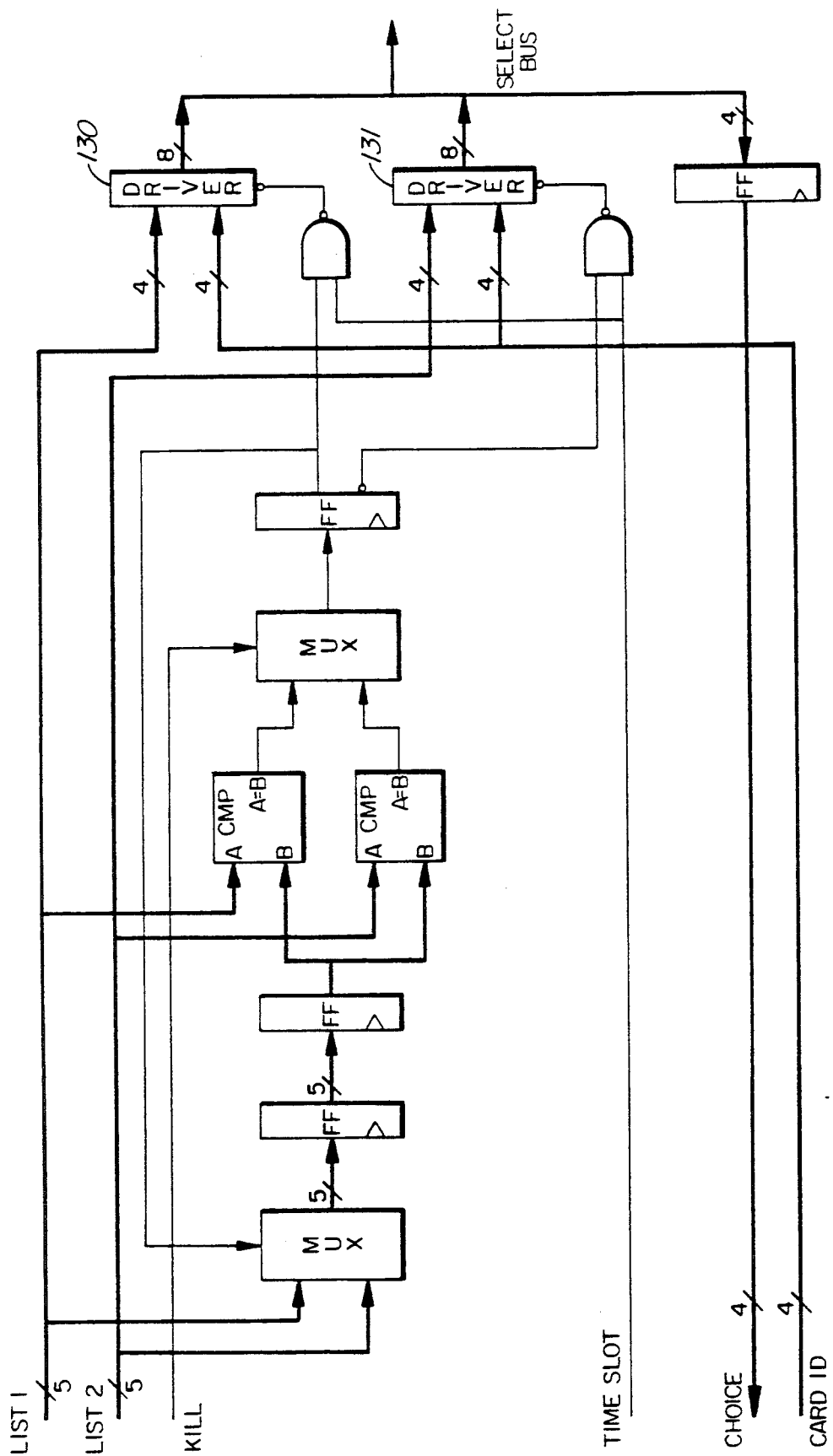
FIG. 13 is a second part of the selection circuit shown in FIG. 8.

As may be seen, two lists, List 1 and List 2, which is one destination address ahead of List 1, are supplied to the selection circuit in FIG. 13. This is necessary to ensure that a destination address in the last flip-flop in FIG. 12, if identical to the one just selected on the select bus, is substituted by the address at the head of List 2.

We claim:

1. An asynchronous transfer mode (ATM) packet switching method comprising the steps of: storing all incoming data packets in order of arrival in a plurality of input packet buffers; polling all incoming data packets for their switch output port destinations; determining on a realtime basis a first plurality of data packets among data packets stored in said plurality of input packet buffers to be applied to input ports of said switch during a packet transmission cycle, following determination of said first plurality of input packets, for transmission through said switch it its output ports; applying said first plurality of data packets to said input ports, wherein the first plurality of data packets is determined by prioritizing data packets stored in said plurality of input packet buffers, and inculding only those data packets, in order or priority, in said first plurality of data packets whose output port destination differs from port destinations of data packets having a higher order of priority, and wherein the order of priority of incoming data packets is established by: measuring the fill of each of said plurality of input packet buffers: and measuring the number of transmission cycles during which no data packets have left each of said plurality of input packet buffers.

2. A packet switching system for cyclically interconnecting a first plurality of input-ports to a second plurality of output-ports, wherein input data packets arriving at said plurality of input ports bear information identifying their output destinations, comprising: a third plurality of input-port packet storage buffers, each having a fourth plurality of independent first-in-first-out (FIFO) packet storage buffers; and said second and fourth pluralities are equal in number and bear fixed assignment relationship on a one-to-one basis to each other irrespective of cyclical interconnections between said first and second pluralities.

3. A packet switching apparatus comprising: a switch having a plurality of independent input ports and a plurality of independent output ports, said switch cyclically reconfigurable in response to switch control means; a plurality of independent input packet storage buffers, one each of cyclically applying a data packet to each one of said plurality of independent input ports; a cyclically updated memory map for storing preddetermined satrus indicia of said plurality of independent input packet storage buffers; and means for cyclically applying said status indicia to said switch control means to reconfigure it.

* * * * *

UNITED STATES PATENT AND TRADEMARK OFFICE
CERTIFICATE OF CORRECTION

PATENT NO. : 5,126,999
DATED : June 30, 1992
INVENTOR(S) : Munter, et al

Page 1 of 2

It is certified that error appears in the above-indentified patent and that said Letters Patent is hereby corrected as shown below:

Column 2, line 5, "[16]is" should read --[16] is--.

Column 4, lines 7 and 8, "inventionc" should read --invention--; line 26, "24" should read --23--; and line 57, "shematiic" should read --schematic--.

Column 5, line 1, "inoue" should read --Inoue--; line 47, "pocket" should read --packet--; and line 48, "of" should read --or--.

Column 6, line 7, "pockets" should read --packet--; line 26, the second occurrence of "input" should read --output--; and line 59, "or" should read --for--.

Column 7, line 32, "(row) 4has" should read --(row 4) has--.

Column 8, line 9, "means" should read --mean--; line 47, "rand" should read --rank--; line 48, "vlaue" should read --value--; and line 51, "broadacast" should read --broadcast--.

Column 9, line 24, "inculding" should read --including--; and line 25, "or" should read --of--.

UNITED STATES PATENT AND TRADEMARK OFFICE
CERTIFICATE OF CORRECTION

PATENT NO.  : 5,126,999                    Page 2 of 2
DATED       : June 30, 1992
INVENTOR(S) : Munter, et al It is certified that error appears in the above-indentified patent and that said Letters Patent is hereby corrected as shown below:

Column 10, line 22, "of" should read --for-- line 24, "preddetermined" should read --predetermined--; and line 25, "satrus" should read --status--.

Signed and Sealed this

Thirty-first Day of August, 1993

Attest:

BRUCE LEHMAN

*Attesting Officer*      *Commissioner of Patents and Trademarks*